F. R. MAZZA & C. M. DALY.
COOKING UTENSIL.
APPLICATION FILED MAR. 2, 1908.
906,540.
Patented Dec. 15, 1908.
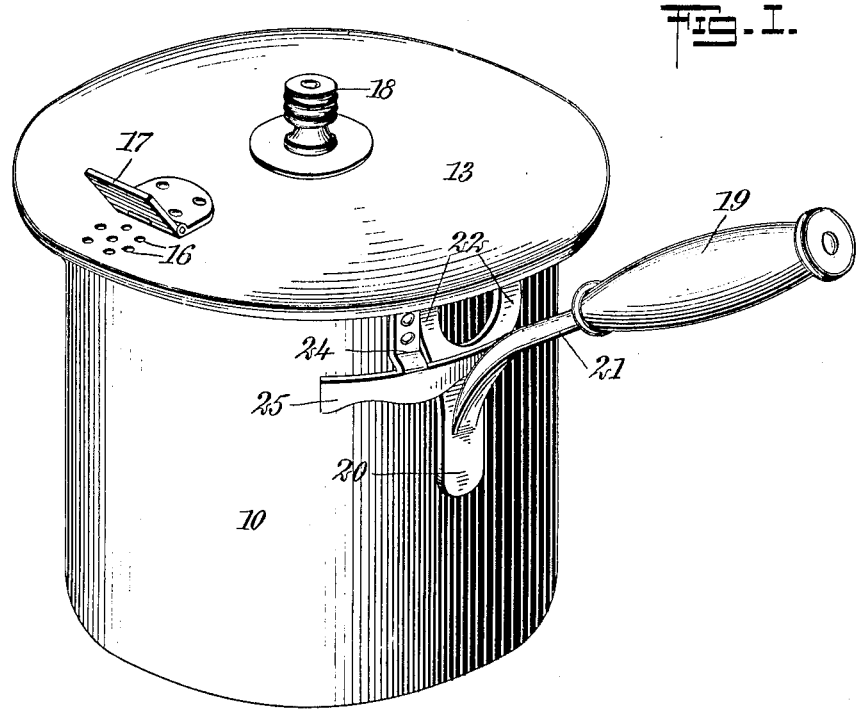
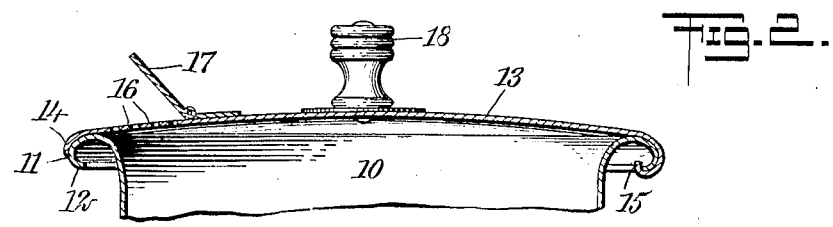
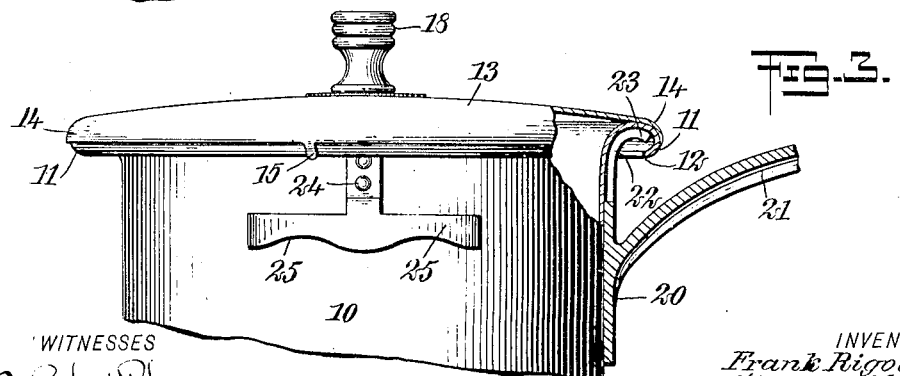
WITNESSES
INVENTORS
Frank Rigo Mazza
Charles M. Daly
BY
ATTORNEYS

UNITED STATES PATENT OFFICE.

FRANK RIGO MAZZA AND CHARLES M. DALY, OF NEW YORK, N. Y.

COOKING UTENSIL.

No. 906,540.  Specification of Letters Patent.  Patented Dec. 15, 1908.

Application filed March 2, 1908. Serial No. 418,764.

*To all whom it may concern:*

Be it known that we, FRANK RIGO MAZZA and CHARLES M. DALY, both citizens of the United States, and residents of the city of New York, borough of Manhattan, in the county and State of New York, have invented a new and Improved Cooking Utensil, of which the following is a full, clear, and exact description.

This invention relates to certain improvements in vessels having detachable handles, and more particularly to that type of vessel in which there is provided an overhanging flange or projection beneath which the handle may be inserted for lifting the vessel.

The object of the invention is to provide means adapted to coöperate with the handle, so that the vessel may be inverted without its becoming separated or detached from the handle.

Reference is to be had to the accompanying drawings, forming a part of this specification, in which similar characters of reference indicate corresponding parts in all the figures, and in which Figure 1 is a perspective view of a vessel constructed in accordance with our invention; Fig. 2 is a vertical section through the upper portion of the vessel and its cover; and Fig. 3 is a side elevation of the upper portion of the vessel and cover, and showing a portion thereof and the handle in section.

The specific form of vessel illustrated in the accompanying drawings and embodying our invention, includes a body portion 10, having the upper edge of the wall thereof bent outwardly and downwardly to form a rounded bead 11, and terminating in an inwardly-directed flange 12 spaced from the side wall of the vessel and slightly below the upper portion of said wall. Above the flange and within the bead, there is formed an annular groove or chamber within which the handle is extended in lifting the vessel. The cover 13 of the vessel is provided with a downwardly-directed curved flange 14, closely fitting the curve of the bead 11, so as to fit the same friction tight. To retain the cover in place while the vessel is inverted, the cover at one point in its periphery, preferably carries an inwardly-directed hook or projection 15, which catches within the flange 12. Opposite to said hook, the cover is preferably provided with a plurality of perforations 16, through which the steam may escape from the vessel and through which water may be drained when the vessel is inverted with the cover in place, said cover being utilized as a strainer. A baffle-plate 17 is preferably hinged to the cover, adjacent the perforations 16, and intermediate said perforations and the central knob or handle 18 of the cover.

For lifting the vessel, we provide a detachable handle having any suitable form of outer end or grip 19, adapted to be grasped by the hand, and having a plate 20 adapted to engage with the side wall of the vessel. The body 21 of the handle is secured to the plate 20 intermediate the ends of the latter, and the upper portion of the plate is preferably subdivided to form two separate branches 22. The upper end of each branch is curved outwardly to form a hook 23, as is illustrated in Fig. 3 of the drawings. In attaching the handle to the vessel, the plate 20 with the hooks 23 may be inserted above the flange 12, and the plate is then brought into engagement with the wall of the vessel. The vessel may now be lifted by means of the handle, or if it is desired, the handle may be left in engagement with the vessel. As soon as a person releases his hold on the handle, the hooks 23 engage with the upper surface of the flange 12 and the handle is held ready for use at any time desired. With the handle in its operative position, it may be moved around the vessel to any side thereof.

In order to permit the vessel to be inverted by means of the handle, so that the contents may be poured from the vessel, we provide the main feature of our invention; that is, means adapted to engage with the plate 20 to hold it in engagement with the wall of the vessel as said vessel is inverted. In the specific form illustrated, this means takes the form of a bracket 24, having arms or projections 25, extending in opposite directions from the base of the bracket substantially parallel to the side wall of the vessel, and spaced therefrom a distance slightly greater than the thickness of the plate 20. In normally lifting the vessel, it is immaterial whether or not the handle be moved to such a position as to bring the plate 20 beneath one of the arms 25, but in case the vessel is to be inverted, the handle is moved to the position shown in Fig. 3 and then slid along the side of the vessel to bring it beneath one of the arms 25. The arms serve to bind the plate to the side wall at a point below the hooks 23, so that said plate is prevented from separating from the side wall.

Having thus described our invention, we claim as new and desire to secure by Letters Patent:

1. In combination, a vessel having an annular flange a separable handle having a portion thereof adapted to engage said flange for lifting the vessel, and means carried by the vessel for engaging with said handle portion, to prevent relative movement of said handle in respect to said vessel as the vessel is inverted by means of the handle.

2. In combination, a vessel having an outwardly-extending portion terminating in an annular inwardly-directed flange upon the exterior of the vessel, adjacent the upper edge thereof, a separable handle having a plate, one portion of which is adapted for engagement beneath said flange for lifting the vessel, and means carried by the vessel for engagement with another portion of said plate for preventing relative movement of the handle in respect to the vessel, as said vessel is inverted by means of the handle.

3. In combination, a vessel having a flange, a separable handle having a portion thereof adapted to engage with said flange for lifting the vessel, and a bracket carried by the vessel and having oppositely-disposed arms adapted to engage with said handle portion to prevent the separation of said handle from said vessel and to permit the vessel to be inverted by means of the handle.

4. In combination, a vessel having an outwardly-extending portion terminating in an annular inwardly-directed flange adjacent the upper edge thereof, a handle having a plate adapted to engage with the side wall of the vessel and having the upper portion of said plate curved for engagement beneath said flange, and a bracket carried by said vessel and having oppositely-disposed arms adapted for engagement with the outer surface of said plate for holding the handle in engagement with the side wall of the vessel and permitting of an inversion of the vessel by means of the handle.

In testimony whereof we have signed our names to this specification in the presence of two subscribing witnesses.

FRANK RIGO MAZZA.
CHAS. M. DALY.

Witnesses:
CLAIR W. FAIRBANK,
JOHN P. DAVIS.